United States Patent [19]
Rubin

[11] 3,851,967
[45] Dec. 3, 1974

[54] EASEL ILLUMINATION MONITORING METHOD

[76] Inventor: Randolph D. Rubin, 301 W. Ohio, Midland, Tex. 79701

[22] Filed: Mar. 7, 1974

[21] Appl. No.: 448,852

Related U.S. Application Data

[62] Division of Ser. No. 315,357, Dec. 15, 1972, Pat. No. 3,807,857.

[52] U.S. Cl. ............................................. 355/77
[51] Int. Cl. ........................................ G03b 27/76
[58] Field of Search ................... 355/68, 71, 77, 61; 354/42

[56] References Cited
UNITED STATES PATENTS

| | | | |
|---|---|---|---|
| 3,106,129 | 10/1963 | Frenk et al. | 354/42 |
| 3,246,586 | 4/1966 | Hunt | 355/38 X |
| 3,307,460 | 3/1967 | Land | 354/42 |
| 3,458,262 | 7/1969 | Greenlee | 355/68 X |
| 3,625,609 | 12/1971 | Clapp | 355/68 X |
| 3,649,120 | 3/1972 | Pfeifer et al. | 355/68 |
| 3,685,901 | 8/1972 | Crete | 355/38 |

*Primary Examiner*—John M. Horan
*Assistant Examiner*—E. M. O'Connor
*Attorney, Agent, or Firm*—Marcus L. Bates

[57] ABSTRACT

Method of making different sizes of photographic enlargements from a negative comprising the steps of making a first size enlargement with a projection printing apparatus by passing light from a lamphouse, through a negative, a primary diaphragm, and a primary lens, so that an image of the negative falls upon an easel.

8 Claims, 9 Drawing Figures

PATENTED DEC 3 1974 3,851,967
SHEET 1 OF 2
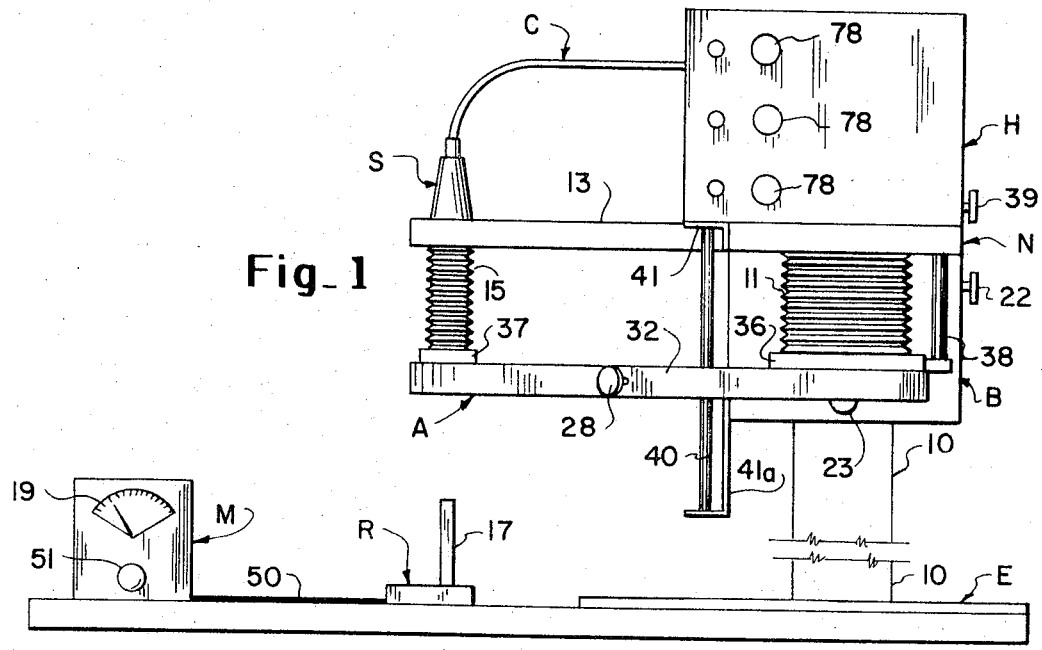
Fig_1
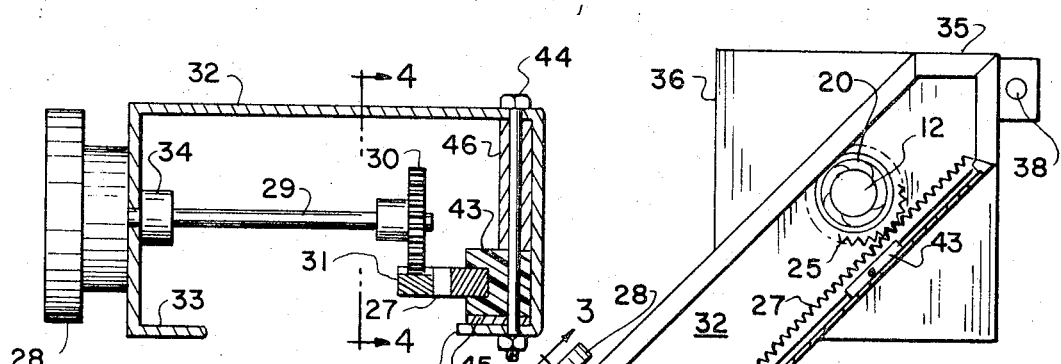
Fig_3  Fig_2
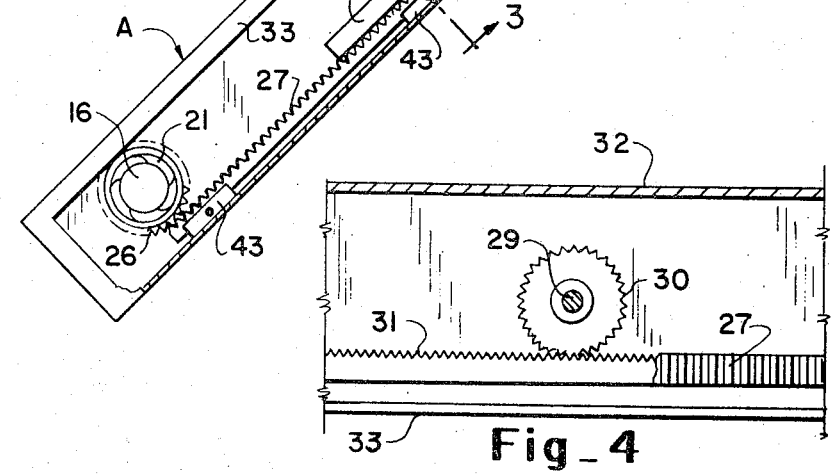
Fig_4

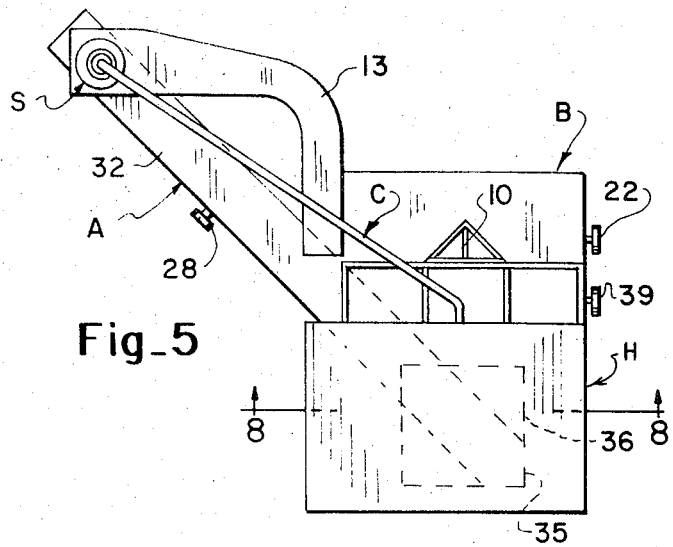
Fig_5
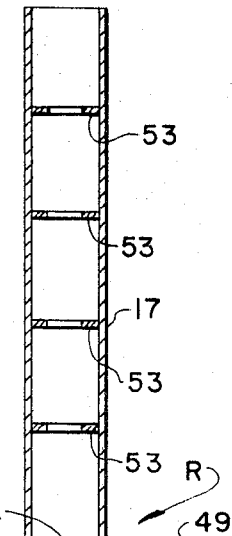
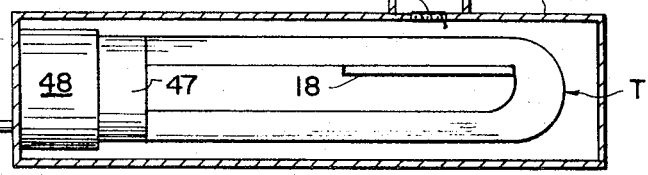
Fig_6
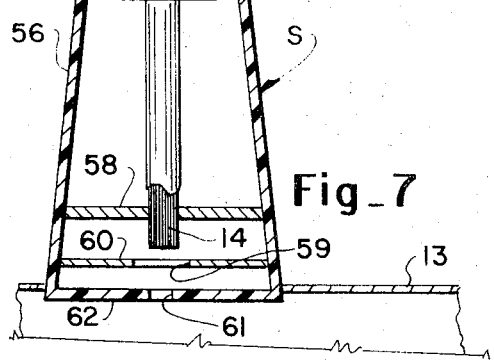
Fig_7
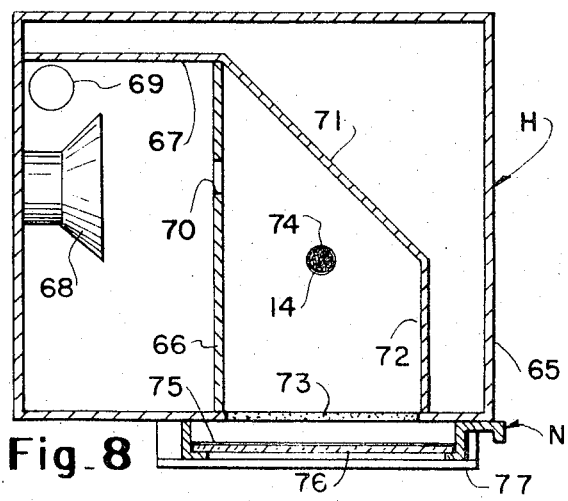
Fig_8
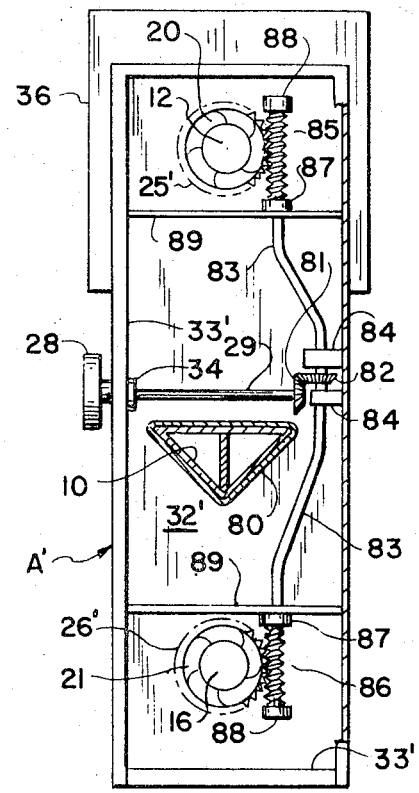
Fig_9

EASEL ILLUMINATION MONITORING METHOD

REFERENCE TO RELATED PATENT APPLICATIONS

The instant application is a division of parent application Ser. No. 315,357, filed Dec. 15, 1972, entitled "EASEL ILLUMINATION MONITOR AND METHOD" now U.S. Pat. No. 3,807,857.

BACKGROUND OF THE INVENTION

This invention relates to an easel illumination monitor and method of making photographic prints.

The purpose of the method of this invention is to permit precise adjustment of the illumination on the easel or exposing plane of a photographic enlarger or other projection device to a previously monitored or calculated value, even though the degree of magnification may be changed.

In addition, the method of this invention permits measured increases or decreases in easel illumination to be made in a very precise manner. One method of providing the desired degree of illumination is by trial exposure wherein a number of different settings of various focusing adjustments of the easel illumination device are made, with a print being made for each different adjustment, and the print which most nearly satisfies the artistic judgment of the discerning operator chosen. For smaller prints, such as 4 inches by 5 inches, the expense of making these trail or test prints is nominal relative to its advantages.

In the absence of the present invention, where a satisfactory trial or test print has been made, it is difficult, if not impossible, even with the educated "guess" of an experienced operator, to duplicate the results produced on the most satisfactory smaller trial print on a larger scale, such as for example prints measuring 20 inches by 25 inches. Therefore, it has heretofore been necessary to produce several trial prints of a larger size before a satisfactory print is obtained. When a large number of the same print are to be made, the expense of the trial prints can be distributed over a greater number of larger prints, however, when only one or two larger prints are being made, the total cost becomes exorbitant because of the number of trial prints required for selection of proper light intensity.

Despite all the variables in obtaining the desired illumination for making a relatively large print with a photographic enlarger, the present invention is based on the discovery that total illumination for the most desirable larger print has a definite relation to the total illumination for the most desirable but much smaller print, and that an accurate reading of the illumination obtained by a densitometer or other device whose output is in the form of the local density reading may be employed in duplicating, in effect, the desired illumination for the larger print. This invention thus involves not only the reading of the illumination when making the most desirable smaller print, but also a duplication of the reading when the most desirable larger print is to be made. In accordance with this invention, this reading is a proportional reading of the light which is supplied to the negative transparency or the like, rather than a reading of the light after passing through the negative transparency, thus avoiding any readings of light or dark areas of the negative or the like. The proportional reading is obtained by insuring that a proportional amount of light passes to the densitometer or other instrument, when making a larger print, as when the most desirable smaller print is made.

While it is desirable to make several test prints of the smaller size, the undue expense and time involved in making test prints of the larger size is eliminated. Thus, in essence, this invention involves the duplication of a proportional light intensity when making a desired larger print, as when the most desirable smaller print was made, and the best method now known for carrying this out is through concurrent adjustment of the diaphragm opening of two lenses, one of which transmits to the print the light which has passed through the negative transparency, and to the other of which a proportional amount of light is being transmitted, and thence to a light intensity instrument whose reading is duplicated.

SUMMARY OF THE INVENTION

This application relates to photographic equipment and specifically to a method of making different sizes of photographic enlargements from a negative comprising the steps of making a first size enlargement with a projection printing apparatus by passing light from a lamphouse, through a negative, a primary diaphragm, and a primary lens so that an image of the negative falls upon an easel.

A sample of light from the lamphouse is directed through a secondary diaphragm and lens, and onto a light sensor apparatus where the value of the light intensity received by the light sensor apparatus is recorded while the first size enlargement of the negative is being made.

A second size enlargement of the negative is then made with the printing apparatus by passing light through the negative, primary diaphragm and lens, with the value of the light intensity received by the light sensor apparatus being adjusted to the same value used while making the first size enlargement of the negative.

Among the objects of this invention is to provide a method of making photographic prints which permits the attributes of a desired print made at a lesser magnification to be reproduced for a print made at a greater magnification, without requiring more than a minimum of judgment or decision by the operator.

Another object of this invention is to provide an easel illumination monitor particularly adapted to carry out the method of this invention.

Another object of this invention is to provide an easel illumination monitor which utilizes to a considerable degree presently available equipment.

Another object of the invention is to provide a method by which an easel illumination monitor can be used to provide the optimum light intensity for printing photographs without resorting to the use of charts, graphs, nomographs or the like.

A still further object of this invention is to provide a method for making photographic prints by the provision of an easel illumination monitor by which a selected smaller print may be reproduced in a larger size, using the same exposure time, to avoid reciprocity failure and slope problems.

A further object of the invention is to provide an illumination monitor which will establish the easel illumination intensity for a first test print through information obtained from an accurate reading of the negative by a densitometer or other "off-easel" device whose output representing the density of the negative or the like to be printed, can be converted into easel illumination units required for printing the negative.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a condensed side elevation of a photographic enlarger embodying this invention;

FIG. 2 is a bottom plan view, on an enlarged scale, of an adjustment device of the enlarger of FIG. 1;

FIG. 3 is a transverse section, on a further enlarged scale, taken along line 3—3 of FIG. 2;

FIG. 4 is a fragmentary longitudinal section taken along line 4—4 of FIG. 3;

FIG. 5 is a top plan view of a lamp housing and associated parts of the enlarger of FIG. 1;

FIG. 6 is a vertical, longitudinal section, on an enlarged scale, of a photoelectric receptor of FIG. 1;

FIG. 7 is a longitudinal section, on an enlarged scale, of a satellite housing of the enlarger of FIG. 1;

FIG. 8 is a vertical section, on a slightly enlarged scale, of the lamp housing and taken along line 8—8 of FIG. 5; and FIG. 9 is a bottom plan view similar to FIG. 2, but showing an alternative adjustment device.

DETAILED DESCRIPTION OF THE PREFERRED EMBODIMENTS

As in FIG. 1, conventional parts of a photographic enlarger, which embodies the present invention, include a lamp housing H which is supported by a bracket B for upward and downward adjustment along an upright standard 10, for producing illumination or light to be projected through a negative transparency disposed in a negative tray N, the light passing through a bellows 11 and an adjustable aperture lens 12, shown in FIG. 2. The image produced by light passing through the negative transparency is projected onto the sensitized material placed on a conventional easel E, for producing the enlargement. Certain details of the above enlarger will be described later.

In accordance with this invention a satellite housing S is mounted on an angular arm 13 which extends laterally from the mounting bracket B to assume the same horizontal position as the negative tray N. Light is transmitted from the lamp housing H through an optical conduit C, which contains a bundle of optical fibers 14 of FIG. 7, and transmits the same proportional intensity of light as is transmitted to the negative transparency, but through an auxiliary lens 16, shown in FIG. 2. This light is directed into a light baffle tube 17, for transmission to a photoelectric tube T positioned within a light receptor R, as in FIG. 6, to impinge upon the cathode 18 thereof. The proportional intensity of light impinging upon the cathode 18 of the photoelectric tube T will have travelled the same distance from the auxiliary lens 16 as has the light from the main lens 12 to the paper on easel E. The intensity of this light may be read on a dial 19 of a meter M, so that a record may be kept of the light intensity indicated by the meter, when a small print, such as four inches by five inches, is made. The reading of the meter dial 19 for the best or selected print of several test prints is recorded and utilized in the production of a much larger print, such as 16 inches by 20 inches, or larger or smaller than the same. The meter M and receptor R may each be essentially a conventional device, as of the normally used type, for reading light intensity for making enlargements. Also, a roll type easel may be substituted for the flat easel shown.

In accordance with this invention, a diaphragm 20 for lens 12 and a diaphragm 21 for lens 16 are concurrently adjusted when the smaller test prints are made and are also concurrently adjusted when the larger print is made. For making the larger print, the bracket B is adjusted upwardly on the standard 10, as by a knob 22, and held in position by a locking knob 23, until the image produced by the light passing through lens 12 is sufficiently large. When making the larger print, the diaphragms are adjusted to produce a size of opening in diaphragm 21 which will produce the same light intensity reading on dial 19 of meter M, as was produced when the selected smaller test print was made. The lens 12 and the lens 16 should be identical lenses, as are also the disphragm 20 and diaphragm 21.

In accordance with this invention, the adjustment device A may utilize a rack and pinion arrangement, as in FIG. 2, a flexible shaft arrangement, as in FIG. 9, or other suitable arrangements, such as chains, belts, driving rods and the like. Thus, the adjustment device A of FIG. 2 includes a ring gear 25 attached to the outside of diaphragm 20, in lieu of the conventional knurled ring for manual turning, and a similar ring gear 26, similarly attached to the outside of the diaphragm 21 of the lens 16. The ring gears 25 and 26, as in FIG. 2, are simultaneously turned by a rack 27 which engages each gear and which will turn each gear the same distance for the same increments of rack movement in either direction. Rack 27 is actuated by a control knob 28 mounted on a stem 29 and on which is mounted a gear 30 of FIGS. 3 and 4, for engagement with an auxiliary rack 31, which is attached to the face of rack 27 in a suitable manner, as by welding or brazing. If desired, rack 27 and auxiliary rack 31 may be integral, with the teeth thereof formed in a suitable manner on the same blank. The length of auxiliary rack 31 is sufficient to move the rack 27, in one direction, to move the diaphragms 20 and 21 to their maximum opening, and, in the opposite direction, to move diaphragms 20 and 21 to their minimum opening. The rack and gear system of the adjusting device A is mounted within a generally rectangular, open bottom housing 32, such as having depending sides and ends and lower, inwardly extending flanges 33, as shown, while a bearing 34 for stem 29 may be attached to one side of the housing, as in FIG. 3. Housing 32 may also be beveled at one corner 35 to correspond with the contour of a supporting block 36 in which lens 12 is mounted and to which the lower edge of bellows 11 is attached. Housing 32 is attached to the underside of block 36 at one end and at the opposite end to the underside of a block 37, in which lens 16 is mounted and to which the lower edge of bellows 15 is attached. Block 36 is supported by a guide rod 38 of FIG. 1, which is movable upwardly and downwardly in a conventional manner by a knob 39, being locked in position by a conventional locking knob (not shown). In addition, housing 32 is stabilized by a guide rod 40 which extends between a pair of angle brackets, an upper bracket 41 being attached to the underside of lamp housing H and a lower bracket 41a to the lower end of mounting bracket B, while the housing 32 is provided on the rear side with a guide block 42 engaging rod 40, as in FIG. 2. Rack 27 is held in engagement with gears 25 and 26 and also guided in movement by a series of slide bearings 43, each of which is formed of nylon, teflon or other suitable material. Each slide bearing is mounted within housing 32, as in FIG. 3, by a bolt 44 which extends through the top of housing 32 adjacent the edge of the housing, and also through one of the lower flanges, while a spacer block 45 beneath each bearing and a spacing tube 46 above each bearing may surround each bolt.

The tube T, as in FIG. 6, may be a conventional photoelectric tube having a light sensitive cathode 18, and a base 47 provided with suitable plugs for engagement with a socket 48, mounted within a generally rectangular housing 49 of receptor R. An electrical cable 50, as in FIG. 1, leads from housing 49 to the conventional meter M, conveniently provided with knob 51 for adjusting the sensitivity of the meter. The top of receptor housing 49, as in FIG. 6, is provided with an aperture in which is placed a diffuser 52 at the base of light tube 17, which is preferably blackened on the inside. Diffuser 52 should be positioned at the same level as the upper surface of the easel E, so that light will travel the same distance from auxiliary lens 16 to diffuser 52, as from main lens 12 to the surface of easel E. Diffuser 52, as well as other diffusers, may be made from a suitable material, such as Plexiglas W-2447 P.80. In addition, the interior of light tube 17 may be provided with a series of vertically spaced, annular baffles 53, which intercept light which might be reflected from side to side of the tube. Tube 17 preferably has a height as great as the lower limit of movement of the adjustment device A will permit, while the inner diameter of light tube 17 should be as small as optical and mechanical limitations permit. Of course, the light tube 17 should be sufficiently high in proportion to its diameter that the normal illumination in the room may be turned on without "blinding" the tube T, to prevent a temporary loss of accuracy in the photoelectric receptor.

The satellite housing S, as in FIG. 7, may be formed of metal or plastic, having a top 55 from whch a diverging cone type side wall 56 depends. The optical conduit C extends through a thimble 57 mounted in top 55 of the housing and thence downwardly through a positioning plate 58. Thimble 57 may be provided with a conventional gripping device (not shown), for adjusting the position of the lower ends of the optical fibers 14, which are preferably ground and polished to a flat surface. The light transmitted from the main housing H through the optical fibers 14 is directed downwardly through a diffuser 59 mounted centrally in a transverse plate 60 and thence through an aperture 61 in a bottom plate 62 of housing S. The size of aperture 61 is preferably selected so that its image, when projected by lens 16 to the plane of diffuser 52 at the lower end of light tube 17, will be approximately three times the diameter of the aperture in which diffuser 52 is mounted, when the projection is adjusted to a minimum magnification. The purpose of this relationship is to eliminate problems associated with edge effects around aperture 61, and also to permit radial optical alignment within mechanical limitations.

The main housing H, as in FIGS. 1 and 8, is illustrated as being similar to the Durst-Pavelle housing, with modifications as indicated below. Thus, the housing H includes a generally rectangular, enclosed box 65, as in FIG. 8, in which an upright, transverse partition 66 and a horizontal partition 67 provide a separate lamp housing, containing one or more illumination lamps 68. A conventional blower tube (not shown) is connected to a hole 69 in the lamp compartment to remove air and heat along with it. One or more apertures 70 in partition 66 permit the light produced in the lamp housing to be transmitted into a light reflector housing, which is bounded by the far side of upright partition 66, an angular top partition 71 and a smaller upright wall partition 72. The angular partition 71, which extends about 45° to the horizontal, is the principal light reflecting surface, although all of the inside surfaces of the light reflecting housing are preferably coated with a highly reflective material of a conventional nature. A diffuser 73 is located in the bottom of the light reflecting housing, to diffuse any spots or areas of greater light intensity than others.

In accordance with this invention, the optical conduit C of FIGS. 1 and 7 is connected to the light reflecting housing at an aperture 74, to which extend the optical fibers 14, exaggerated in FIG. 8 for clarity of illustration, preferably being ground off to form an essentially planar surface at the aperture 74.

The negative tray N, in which the negative transparency 75 is placed on a plate 76, is supported beneath the light housing in any suitable manner, as by a pair of angular guides 77 attached to the underside of housing H. It will be understood that the main housing H shown is a color enlarger housing of the Durst type, also having provision for the imposition of dichroic filters into the light path, as in aperture 70, with knobs 78 of FIG. 1 on the outside of the housing for controlling the positioning of the filters.

The alternative adjustment device A' of FIG. 9 is adapted to place the lens 16 and bellows 15 in a position behind the main housing H, on the opposite side of supporting column 10, which passes through the adjustment device, to thereby utilize the column 10 for greater stability. The adjustment device A' includes a housing 32' which is generally rectangular and provided with depending sides and ends having inwardly extending flanges 33' and a central, depending guide flange 80 which surrounds and engages the supporting column 10. As before, the supporting block 36 is attached to one end of the housing 32', while lens 12 and its accompanying diaphragm 20 is mounted therein. Similarly, the supporting block 37 of FIG. 1 is attached to the opposite end of the housing 32', while lens 16 and its accompanying diaphragm 21 is mounted therein. The control knob 28 mounted on stem 29 extends from one side of housing 32', but a bevel gear 81 is mounted on the opposite end of stem 29, for engagement with a second bevel gear 82 mounted on a flexible shaft 83. A pair of bearings 84, supported from the top and one side of housing 32', engage flexible shaft 83 on opposite sides of bevel gear 82, while worm gears 85 and 86 are mounted on the opposite ends of the flexible shaft, with a bearing 87 at the inner end of each worm gear and a bearing 88 at the outer end of each worm gear. Bearings 87 are mounted on one of a pair of transverse partitions 89, while bearings 88 are attached to the corresponding side of housing 32' or flange 33' or both. Ring gear 25', for adjusting diaphragm 20 for lens 12, is provided with worm teeth for engagement by worm 85, while a gear 26', for adjusting diaphragm 21 for lens 16, is similarly provided with worm teeth for engagement with worm 86. As will be evident, flexible shaft 83 permits the column 10 to be cleared without unduly increasing the size of housing 32'. However, as before, adjustment knob 28 may be utilized in turning the respective worm gears 85 and 86 equal increments of movement in either direction, to set the opening of the respective diaphragms 20 and 21 to identical positions.

In carrying out the method of this invention, with the easel illumination monitor described above, a set of several test prints of a smaller size are made by adjusting the distance of lens 12 from easel E, so that the projection of the image obtained through light passing from the housing H through the transparency 75 will be of an appropriate size for the photographic paper on the easel. The diaphragm 20 for lens 12 will be adjusted to different positions by turning the knob 28, in order to make a series of test prints. Of course, when the diaphragm 20 for lens 12 is adjusted by knob 28, the diaphragm 21 for lens 16 will be concurrently adjusted to the same size. As each test print is made, a proportional amount of the light passing through the transparency will be transmitted through the optical conduit C, by the optical fibers 14, to the lens 16. This light passes from lens 16 to the receptor R, which may, for instance, be a neutral density analyzer manufactured by Electronic Systems Engineering Co. of Cushing, Oklahoma. For each test exposure, a reading of the meter M is recorded, so that the reading of the meter for the selected test print can be later duplicated.

In making a print of a much larger size, the position of the lens 12 is adjusted, vertically in this instance, so that the size of the image will correspond to the size of the print to be made on the photographic paper placed on easel E. In making the enlarged print, the diaphragm 20 for lens 12 and also the diaphragm 21 for lens 16 are concurrently adjusted until the light impinging upon tube T in receptor R produces the identical reading on meter M, as was obtained when the selected test print was made. Thus, the diaphragm 21 for lens 16 is actually the diaphragm which is adjusted to obtain the duplicate reading on the meter M, but the diaphragm 20 for lens 12 is simultaneously adjusted to the same relative position. Thus, the light intensity which produced the selected test print can be duplicated for the larger print, irrespective of the adjustment of the lens 12 toward or away from the easel E, using only the record of the reading of the meter M when the selected smaller print was made.

As will be evident, the foregoing method of this invention eliminates the necessity for several trial prints of a larger size, as well as eliminating the use of charts, graphs, expanded scales or diagrams, nomographs and rules attached to the enlarger chassis, as well as movement of a photometer to obtain the location of large, even density areas of the negative. In addition, the manner of duplication of the reading of the meter M eliminates any educated "guess" based upon the experience of the operator.

The adjustment device A or A' and associated parts may also be utilized with the "Kodak" Color Negative Translator, Model 3, or a similar device, to enhance the performance thereof in making color prints. The light pickup probe for this translator may be substituted for the receptor R, but preferably with the light baffle tube 17 of FIGS. 1 and 6 added, while the translator may be substituted for the meter M. As with such a device, the numerical figures given by a negative analyzer, which may be separate and even outside the dark room to provide an "off easel" analysis, are set in the translator in the customary manner. Then, the knobs 78 may be individually adjusted to properly position the respective color filters, as within the housing H at the lamp side of aperture 70 of FIG. 8, until the color meters of the translator are each nulled. These color meters are a magenta-cyan and a yellow-cyan meter, which are nulled when the ratios of these colors equal that determined by the off easel analysis. Thus, one of the knobs 78 will adjust a cyan filter to control the red light, a second will adjust a magenta filter to control the green light, and the third will adjust a yellow filter to control the blue light. Another reading obtained from the off easel analysis is the exposure reading, for which the translator is set. However, the knob 28 of the adjustment device A or A' is turned until the exposure meter nulls. Thus, the use of the adjustment device of this invention eliminates the removal and reinsertion of the negative, one or more times, as well as other steps usually utilized in the operation of such translator or a similar device.

One unexpected advantage of the instant invention lies in the capability of changing the relative color values (filtration) of the light source and thereafter immediately adjusting the light source to the previously set light intensity.

For example, upon viewing a first test print, an excess of red may be noted. This excess of one color is adjusted in the lamp house by manipulating knobs 78 until the desired correction is obtained.

At this point, it will be noted that the illumination on the easel has changed and therefore it must be adjusted back to the original selected value used in making the first print. The result will be a print which has pleasing color value while the density will remain at an optimum value. This enables wide excursions in color values to be made without adversely affecting the density of the print.

I claim:

1. Method of controlling the relative exposure light intensity while making different sizes of photographic prints with a projection printing apparatus comprising the steps of:
    1. mounting a projection printing apparatus having a primary diaphragm and lens therein in spaced relation respective to an easel;
    2. passing light from a light source, through a negative, through the primary diaphragm and lens, and onto printing paper supported by the easel;
    3. passing a sample of light from said light source, through a secondary diaphragm and lens, and onto a light sensor apparatus;
    4. spacing said light sensor and said secondary lens a distance apart which is proportional to the spacing between said easel and said primary lens;
    5. concurrently and proportionally adjusting both diaphragms to thereby select the optimum light intensity for making a first size print;

6. measuring the intensity of the light which passes into the light sensor apparatus;
7. making a second size print by changing the magnification and concurrently and proportionally adjusting both diaphragms to cause the light sensor to receive the same light intensity measured in step (6).

2. The method of claim 1 wherein step (4) is carried out by spacing said light sensor from said secondary lens a distance which is equal to the spacing between said easel and said primary lens; and
said primary and secondary lenses are selected from lenses which are identical in light passing characteristics.

3. The method of claim 1 and further including the step of passing a sample of light from the lamp house of the light source, through a light conducting passageway, and into a secondary lamp house before passing the light through said secondary diaphragm and lens.

4. The method of claim 3 and further including the step of spacing said light sensor from said secondary lens a distance which is identical to the spacing between said easel and said primary lens; and
said primary and secondary lenses are selected from lenses which are identical in light passing characteristics.

5. Method of controlling exposure light intensity while making different sizes of photographic enlargements from a negative, comprising the steps of:
1. making a first size enlargement with a projection printing apparatus by passing light from a lamp house through a negative, a primary diaphragm, and a primary lens;
2. passing a sample of light from said lamp house of said projection printing apparatus, through a second diaphragm and lens, and onto a light sensor apparatus;
3. recording the value of the light intensity received by the light sensor apparatus while making said first size enlargement of the negative;
4. making a second size enlargement of the negative with the printing apparatus by passing light through the negative, diaphragm, and lens,
5. concurrently and proportionally adjusting both said diaphragm means in order to adjust the relative value of the light intensity when making said second size enlargement to the sane value used while making said first size enlargement of the negative.

6. The method of claim 5, and further including the step of maintaining the same distance between said secondary lens and said light responsive device respective to the distance measured between said first lens and the print, while exposing each of said prints.

7. The method of claim 5 wherein steps (1) and (2) are carried out by spacing said light sensor from said secondary lens a distance which is identical to the spacing between said easel and said primary lens; and
said primary and secondary lenses are selected from lenses which are identical in light passing characteristics.

8. The method of claim 5 and further including the step of passing a sample of light from the lamp house of the light source, through a light conducting passageway, and into a secondary lamp house before passing the light through said secondary diaphragm and lens.

* * * * *